(12) United States Patent
Pellegrino et al.

(10) Patent No.: US 6,983,303 B2
(45) Date of Patent: Jan. 3, 2006

(54) STORAGE AGGREGATOR FOR ENHANCING VIRTUALIZATION IN DATA STORAGE NETWORKS

(75) Inventors: Greg Pellegrino, Tomball, TX (US); Mike Sabotta, Cypress, TX (US); Robert Elliott, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 10/061,956

(22) Filed: Jan. 31, 2002

(65) Prior Publication Data

US 2003/0145045 A1    Jul. 31, 2003

(51) Int. Cl.
G06F 15/16    (2006.01)

(52) U.S. Cl. .......................... 709/203; 709/223; 711/6; 711/100

(58) Field of Classification Search ................ 709/203, 709/223; 711/203, 111, 223; 714/7
See application file for complete search history.

(56) References Cited

U.S. PATENT DOCUMENTS

| | | | |
|---|---|---|---|
| 5,819,296 A | 10/1998 | Anderson et al. | |
| 5,832,515 A | 11/1998 | Ledain et al. | |
| 5,852,724 A | 12/1998 | Glenn et al. | |
| 5,872,931 A | 2/1999 | Chivaluri | |
| 5,944,782 A | 8/1999 | Noble et al. | |
| 5,996,054 A | 11/1999 | Ledain et al. | |
| 6,021,408 A | 2/2000 | Ledain et al. | |
| 6,067,607 A | 5/2000 | Maegawa et al. | |
| 6,101,508 A | 8/2000 | Wolff | |
| 6,195,730 B1 | 2/2001 | West | |
| 6,256,683 B1 | 7/2001 | Barry | |
| 6,282,710 B1 | 8/2001 | Boehler | |
| 6,460,113 B1 * | 10/2002 | Schubert et al. ............. 711/111 |
| 6,553,408 B1 * | 4/2003 | Merrell et al. ............... 709/213 |
| 6,578,158 B1 * | 6/2003 | Deitz et al. .................... 714/11 |
| 6,640,278 B1 * | 10/2003 | Nolan et al. .................... 711/6 |
| 2005/0055603 A1 * | 3/2005 | Soran et al. .................... 714/7 |

* cited by examiner

*Primary Examiner*—Kamini Shah (57) ABSTRACT

A method, and corresponding storage aggregator, for aggregating data storage within a data storage network. The storage network includes a server with consumers or upper level applications, a storage system with available storage, and a fabric linking the server and the storage system. The method includes pooling the available storage to create virtual drives, which represent the available storage and may be a combination of logical unit number (LUN) pages. The volumes within the available data storage are divided into pages, and volumes of LUN pages are created based on available pages. The virtual drives are presented to the server, and a logical command is received from the server requesting access to the storage represented by the virtual drives. The command is transmitted to controllers for the available storage and a link is established between the server and controllers with data being exchanged directly between the server and controllers.

20 Claims, 4 Drawing Sheets

STORAGE AGGREGATOR FOR ENHANCING VIRTUALIZATION IN DATA STORAGE NETWORKS

BACKGROUND OF THE INVENTION

1. Field of the Invention

The present invention relates, in general, to data storage networking technology, and more particularly, to a system and method for aggregating storage in a data storage network environment that enhances storage virtualization and that in one embodiment utilizes remote direct memory access (RDMA) semantics on interconnects.

2. Relevant Background

Storage virtualization techniques are rapidly being developed and adopted by the data storage industry. In storage virtualization, the user sees a single interface that provides a logical view, rather than a physical configuration, of the storage devices available to the user in the system or storage network. Virtualization techniques are implemented in software and hardware such that the user has no need to know how storage devices are configured, where the devices are located, the physical geometry of the devices, or their storage capacity limits. The separation of the logical and physical storage devices allows an application to access the logical image while minimizing any potential differences of the underlying device or storage subsystems.

Virtualization techniques have the potential of providing numerous storage system benefits. Physical storage devices typically can be added, upgraded, or replaced without disrupting application or server availability. Virtualization can enable storage pooling and device independence (or connectivity of heterogeneous servers), which creates a single point of management rather than many host or server storage controllers. A key potential benefit of virtualization of systems, including storage area networks (SANs) and network attached storage (NAS), is the simplification of administration of a very complex environment.

The cost of managing storage typically ranges from 3 to 10 times the cost of acquiring physical storage and includes cost of personnel, storage management software, and lost time due to storage-related failures and recovery time. Hence, the storage industry is continually striving toward moving storage intelligence, data management, and control functions outboard from the server or host while still providing efficient, centralized storage management. Present virtualization techniques, especially at the SAN and NAS levels, fail to efficiently manage the capacity and performance of the individual storage devices and typically require that the servers know, understand, and support physical devices within the storage network.

For virtualized storage to reach its potentials, implementation and deployment issues need to be addressed. One common method of providing virtualized storage is symmetric virtualization in which a switch or router abstracts how storage controllers are viewed by users or servers through the switch or router. In implementation, it is difficult in symmetric virtualization to scale the storage beyond the single switch or router. Additionally, the switch or router adds latency to data movement as each data packet needs to be cracked and then routed to appropriate targets and initiators. Another common method of providing virtualized storage is asymmetric virtualization in which each host device must understand and support the virtualization scheme. Generally, it is undesirable to heavily burden the host side or server system with such processing. Further, it is problematic to synchronize changes in the network with each host that is involved in the virtualization of the network storage.

Hence, there remains a need for an improved system and method for providing virtualized storage in a data storage network environment. Preferably, such a system would provide abstraction of actual storage entities from host servers while requiring minimal involvement by the host or server systems, improving storage management simplicity, and enabling dynamic storage capacity growth and scalability.

SUMMARY OF THE INVENTION

The present invention addresses the above discussed and additional problems by providing a data storage network that effectively uses remote direct memory access (RDMA) semantics or other memory access semantics of interconnects, such as InfiniBand (IB), IWARP (RDMA on Internet Protocol (IP)), and the like, to redirect data access from host or server devices to one or more storage controllers in a networked storage environment. A storage aggregator is linked to the interconnect or communication fabric to manage data storage within the data storage network and represents the storage controllers of the data storage to the host or server devices as a single storage pool. The storage controllers themselves are not directly accessible for data access as the storage aggregator receives and processes data access commands on the interconnect and forwards the commands to appropriate storage controllers. The storage controllers then perform SCSI or other memory access operations directly over the interconnect with the requesting host or server devices to provide data access, e.g., two or more communication links are provided over the interconnect to the server (one to the appropriate storage controller and one to the storage aggregator).

As will be described, storage aggregation with one or more storage aggregators effectively addresses implementation problems of storage virtualization by moving the burden of virtualization from the host or server device to the aggregator. The storage aggregators appear as a storage target to the initiating host. The storage aggregators may be achieved in a number of arrangements including, but not limited to, a component in an interconnect switch, a device embedded within an array or storage controller (such as within a RAID controller), or a standalone network node. The data storage network, and the storage aggregator, can support advanced storage features such as mirroring, snapshot, and virtualization. The data storage network of the invention controls data movement latency, provides a readily scalable virtualization or data storage pool, enhances maintenance and configuration modifications and upgrades, and outloads host OS driver and other requirements and burdens to enhance host and storage network performance.

More particularly, a method is provided for aggregating data storage within a data storage network. The data storage network may take many forms and in one embodiment includes a server with consumers or upper level applications, a storage system or storage controller with available storage, such as a RAID system with an I/O controller, and a communication fabric linking the server and the storage system. The method includes pooling the available storage to create virtual drives, which represent the available storage and may be a combination of logical unit numbers (LUNs) or LUN pages. The pooling typically involves dividing the volumes within the available data storage into pages and then creating aggregate volumes of LUN pages based on these available pages.

The method continues with presenting the virtual drives to the server over the fabric and receiving a logical command from the server for access to the available storage represented by the virtual drives. Next, the logical command is processed and transmitted to the controllers in the data storage system controlling I/O to the available storage called for in the command. The method further may include establishing a direct communication link between the server and the storage controllers and exchanging data or messages directly between the requesting device and the storage controller. In one embodiment, the fabric is a switch matrix, such as an InfiniBand Architecture (IBA) fabric, and the logical commands are SCSI reads and writes.

DETAILED DESCRIPTION OF THE PREFERRED EMBODIMENTS

The present invention is directed toward aggregation of storage in a data storage network or system. The storage aggregation is performed by one or more storage aggregators that may be provided as a mechanism within a switch, as a separate node within the storage network, or as an embedded mechanism within the storage system. Generally, the storage aggregator is linked to a communication network or fabric and functions to pool network storage, to present the virtual pooled storage as a target for hosts attached to the communication network, to receive data access commands from the hosts, and to transmit the data access commands to appropriate storage controllers which respond directly to the requesting hosts. To this end, the storage aggregator utilizes or supports the direct memory access protocols of the communication network or fabric communicatively linking host devices to the storage aggregator and the storage system.

The following description details the use of the features of the present invention within the InfiniBand Architecture (IBA) environment, which provides a switch matrix communication fabric or network, and in each described embodiment, one or more storage aggregators are provided that utilize and complies with SCSI RDMA Protocol (SRP). While the present invention is well-suited for this specific switched matrix environment, the features of the invention are also suited for use with different interconnects, communication networks, and fabrics and for other networked storage devices and communication standards and protocols, which are considered within the breadth of the following description and claims.

Figure 1:
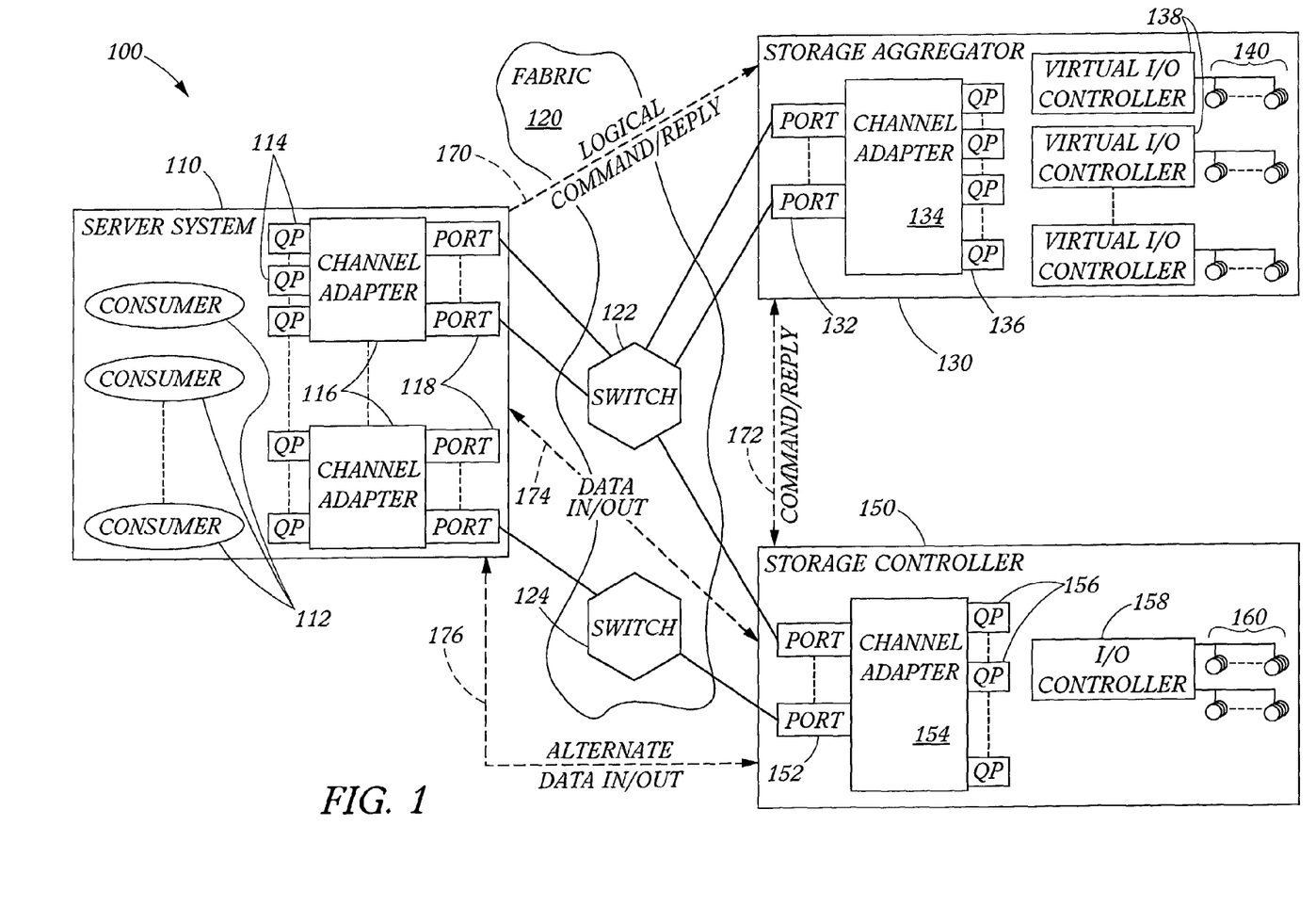
FIG. 1 illustrates a data storage network according to the present invention utilizing a storage aggregator to manage and represent a storage system to consumers or applications of a host server system.

FIG. 1 illustrates an exemplary data storage network 100 in which responsibility and control over advanced data storage features including aggregation, virtualization, mirroring, and snapshotting is moved from a host processor or system to a separate storage aggregation device or devices. The illustrated data storage network 100 is simplified for explanation purposes to include a single host or server system 110, a storage aggregator 130, and storage system or storage controller 150 all linked by the switched matrix or fabric 120. During operation, the storage aggregator 130 functions to control access to the storage system 150 and, significantly, is seen as a target by the server system 110. In practice, numerous ones of each of these components may be included within the data storage network 100. For example, two or more servers or server systems may be linked by two or more switches over a fabric or network to a single storage aggregator (or more aggregators may be included to provide redundancy). The single aggregator (e.g., a mechanism or system for providing virtual representation of real controllers and real drives in one or more storage controllers) may then control access to a plurality of storage controllers (e.g., storage systems including real controllers and real drives).

As illustrated, the storage network 100 is configured according to InfiniBand (IB) specifications. To this end, the IB fabric 120 is a switch matrix and generally will include a cabling plant, such as one or more four-copper wire, two-fiber-optic lead cabling, or printed circuit wiring on a backplane, and includes one or more IB switches 122, 124. The switches 122, 124 pass along packets based on the destination address in the packet's local route header and expose two or more ports between which packets are relayed, thus providing multiple, transparent paths between endnodes in the network 100. Although not shown, gateways, such as routers and InfiniBand-to-Gigabit Ethernet devices, may be provided to reach beyond the illustrated cluster. Communication traffic within the network 100 is data link switched from source to destination (with off-subnet traffic (not shown) being routed using network-layer addressing). Communication between server system 110 and devices such as aggregator 130 and storage system 150 is accomplished through messages, which may be SCSI data access commands such as SCSI read or write operations, that provide high-speed data transfer. In a preferred embodiment, the network 100 operates according to the SCSI RDMA protocol (SRP) which facilitates serial SCSI mapping comparable to FCP and iSCSI and moving block SCSI data directly into system memory via RDMA. The aggregation features of the invention are intended to be used with a wide variety of protocols and commands and to include those not yet available (such as an iSCSI RDMA protocol).

SRP provides standards for the transmission of SCSI command set information across RDMA channels between SCSI devices, which allows SCSI application and driver software to be successfully used on InfiniBand (as well as the VI Architecture, and other interfaces that support RDMA channel semantics). The fabric 120 may be thought of as part of a RDMA communication service which includes the channel adapters 116, 154. Communication is provided by RDMA channels between two consumers or devices, and an RDMA channel is a dynamic connection between two devices such as the consumers 112 and the storage aggregator 130 or the storage system 150. An RDMA channel generally allows consumers or other linked devices to exchange messages, which contain a payload of data bytes, and allows RDMA operations such as SCSI write and read operations to be carried out between the consumers and devices.

The server system 110 includes a number of consumers 112, e.g., upper layer applications, with access to channel adapters 116 that issue data access commands over the fabric 120. Because InfiniBand is a revision of conventional I/O, InfiniBand servers such as server 110 generally cannot directly access storage devices such as storage system 150. The storage system 150 may be any number of storage devices and configurations (such as a RAID system or blade) with SCSI, Fibre Channel, or Gigabit Ethernet and these devices use an intermediate gateway both to translate between different physical media and transport protocols and to convert SCSI, FCP, and iSCSI data into InfiniBand format. The channel adapters 116 (host channel adapters (HCAs)) and channel adapters 154 (target channel adapters (TCAs)) provide these gateway functions and function to bring SCSI and other devices into InfiniBand at the edge of the subnet or fabric 120. The channel adapters 116, 154 are the hardware that connect a node via ports 118 (which act as SRP initiator and target ports) to the IB fabric 120 and include any supporting software. The channel adapters 116, 154 generate and consume packets and are programmable direct memory access (DMA) engines with special protection features that allow DMA operations to be initiated locally and remotely.

The consumers 112 communicate with the HCAs 116 through one or more queue pairs (QPs) 114 having a send queue (for supporting reads and writes and other operations) and a receive queue (for supporting post receive buffer operations). The QPs 114 are the communication interfaces. To enable RDMA, the consumers 112 initiate work requests (WRs) that cause work items (WQEs) to be placed onto the queues and the HCAs 116 execute the work items. In one embodiment of the invention, the QPs 114 return response or acknowledgment messages when they receive request messages (e.g., positive acknowledgment (ACK), negative acknowledgment (NAK), or contain response data).

Similarly, the storage system 150 is linked to the fabric 120 via ports 152, channel adapter 154 (such as a TCA), and QPs 156. The storage system 150 further includes an IO controller 158 in communication with I/O ports, I/O devices, and/or storage devices (such as disk drives or disk arrays) 160. The storage system 150 may be any of a number of data storage configurations, such as a disk array (e.g., a RAID system or blade). Generally, the storage system 150 is any I/O implementation supported by the network architecture (e.g., IB I/O architecture). Typically, the channel adapter 154 is referred to as a target channel adapter (TCA) and is designed or selected to support the capabilities required by the IO controller 158. The IO controller 158 represents the hardware and software that processes input and output transaction requests. Examples of IO controllers 158 include a SCSI interface controller, a RAID processor or controller, a storage array processor or controller, a LAN port controller, and a disk drive controller.

The storage aggregator 130 is also linked to the fabric 120 and to at least one switch 122, 124 to provide communication channels to the server system 110 and storage system 150. The storage aggregator 130 includes ports 132, a channel adapter 134 (e.g., a TCA), and a plurality of QPs 136 for linking the storage aggregator 130 to the fabric 120 for exchanging messages with the server system 110 and the storage system 150. At least in part to provide the aggregation and other functions of the invention, the storage aggregator 130 includes a number of virtual IO controllers 138 and virtual drives 140. The virtual IO controllers 138 within the storage aggregator 130 provide a representation of the storage system 150 (and other storage systems) available to the server system 110. A one to one representation is not needed. The virtual drives 140 are a pooling of the storage devices or space available in the network 100 and as shown, in the storage devices 160. For example, the virtual drives 140 may be a combination of logical unit number (LUN) pages in the storage system 150 (which may be a RAID blade). In a RAID embodiment, the LUNs may be mirrored sets on multiple storage systems 150 (e.g., multiple RAID blades). A LUN can be formed as a snapshot of another LUN to support snapshotting.

Although multiple partitions are not required to practice the invention, the data storage network 100 may be divided into a number of partitions to provide desired communication channels. In one embodiment, a separate partition is provided for communications between the server system 110 and the storage aggregator 130 and another partition for communications among the storage aggregator 130, the server system 110, and the storage system 150. More specifically, one partition may be used for logical commands and replies 170 between the server system 110 and the storage aggregator 130 (e.g., SRP commands). The storage aggregator 130 advertises its virtual I/O controllers 138 as supporting SRP. A consumer 112 in the server system 110 sends a command, such as a SCSI command on SRP-IB, to a virtual LUN or drive 140 presented by a virtual IO controller 138 in the storage aggregator 130.

The other partition is used for commands and replies 172 (such as SCSI commands), data in and out 174, and the alternate or redundant data in and out 176 messages. The storage system 150 typically does not indicate SRP support but instead provides vendor or device-specific support. However, the storage system 150 is configured for support SRP only for use by storage aggregator 130 initiators to enable commands and replies 172 to be forwarded onto the storage system 150. In some cases, the storage system 150 is set to advertise SRP support until it is configured for use with the storage aggregator 130 to provide generic storage implementation to the data storage network 100.

In response to the logical command 170, the storage aggregator 130 spawns commands 172 (such as SCSI commands) to one or more LUNs 160 via the IO controller 158. For example, in a RAID embodiment, the storage aggregator 130 may spawn commands 172 to one or more LUNs 160 in RAID blade 150 (or to more than one RAID blades, not shown) representing the command 170 from the server system or blade 110. The storage system 150 responds by performing data movement operations (represented by arrow 174) directly to the server system 110 (or, more particularly, the server system 110 memory). The storage system 150 sends reply 172 when its I/O operations for the received command 172 are complete. The storage aggregator 130 sends reply 170 to the server system 110 when all the individual storage systems 150 to which commands 172 were sent have replied with completions for each command (e.g., each SCSI command) that was spawned from the original server system 110 logical command 170. As will be understood, the logical commands 170 may include SRP reads and writes with minimal additional overhead or latency being added to the I/O operations.

Storage aggregation is a key aspect of the invention. In this regard, storage aggregation is provided by the storage aggregator 130 as it provides virtualization of SCSI commands 170 transmitted to the aggregator 130 from the host server 110. The aggregator 130 processes the commands 170 and distributes or farms out data movement portions, as commands 172, of the commands 170 to storage controller (or controllers not shown) 150. The storage controller 150 in turn directly moves data 174 to and from host memory (not shown) on server 110. The storage controller(s) 150 finish data movement 174 then reply 172 to the storage aggregator 130. The storage aggregator 130 collects all the replies 172 to its initial movement commands 172 and sends a response (such as a SCSI response) to the host server 110. During operations, it is important that the storage aggregator's 130 virtualization tables (discussed below with reference to FIG. 3) are maintained current or up-to-date which is typically done across the switched fabric 120.

Figure 2:
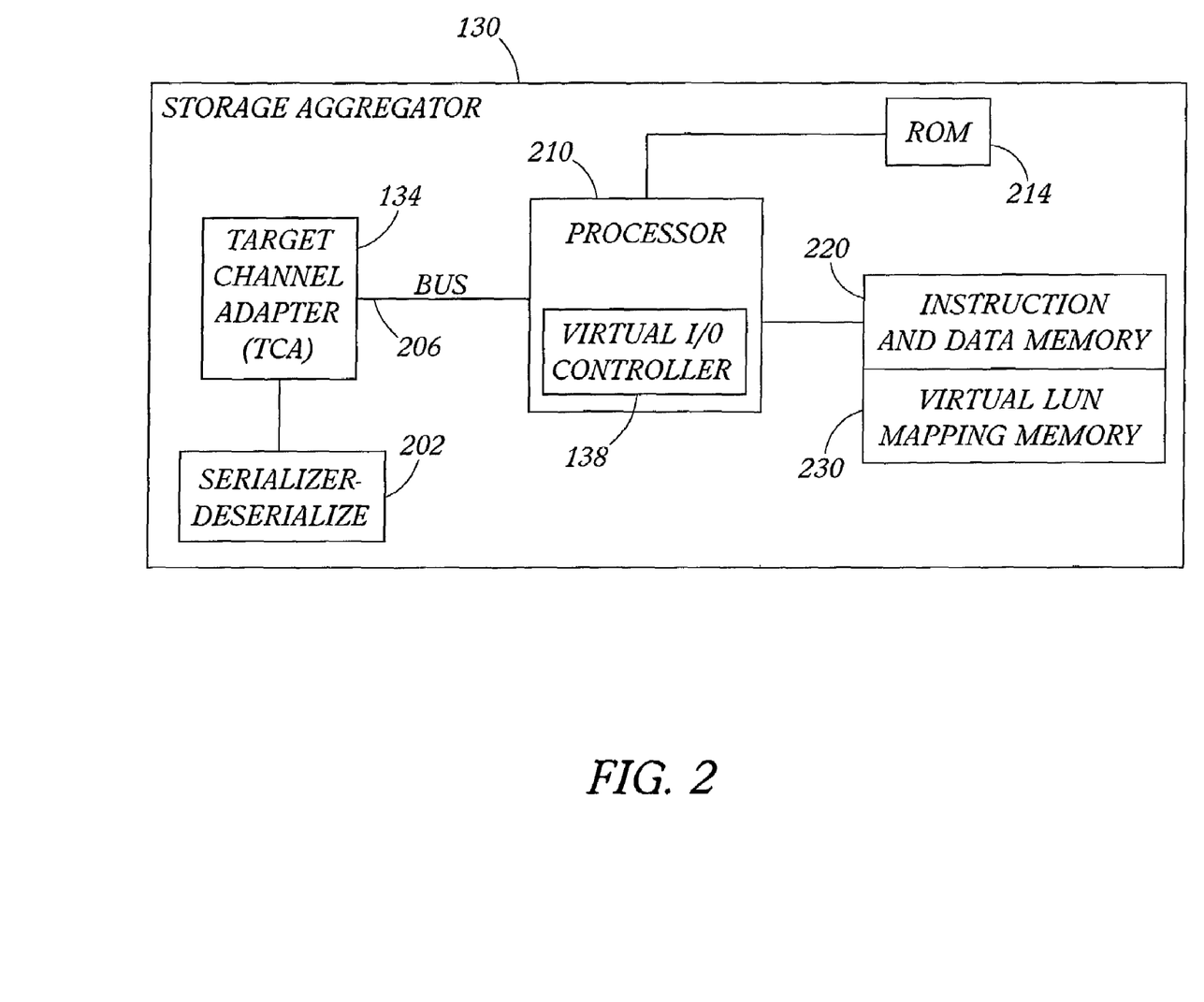
FIG. 2 is a simplified physical illustration of an exemplary storage aggregator useful in the network of FIG. 1.

Referring now to FIG. 2, a simplified block illustration is provided of the physical view of the exemplary storage aggregator 130 of the network of FIG. 1. As shown, the storage aggregator 130 includes a serializer-deserializer 202 that may be connected to the links (not shown) of the fabric 120 and adapted for converting serial signals to parallel signals for use within the aggregator 130. The parallel signals are transferred to the target channel adapter 134, which processes the signals (such as SCSI commands) and places them on the aggregator I/O bus 206. A number of bus configurations may be utilized, and in one embodiment, the bus 206 is a 66-MHz PCI bus, 133-MHz PCIX bus, or the like. A processor or CPU 210 is provided to provide many of the aggregation features, such as processing the software or firmware that provides the virtual I/O controllers 138 as shown. The processor 210 is linked to ROM 214 and to additional memory 220, 230, which stores instructions and data and the virtual LUN mapping, respectively that provides the virtual drives 140.

With a general understanding of the physical features of a storage aggregator 130 and a network 100 incorporating such an aggregator 130 understood, a description of logical structure and operation of the storage aggregator 130 will be provided to facilitate full understanding of the features of the storage aggregator 130 that enhanced virtualization and provide other advanced data storage features.

Figure 3:
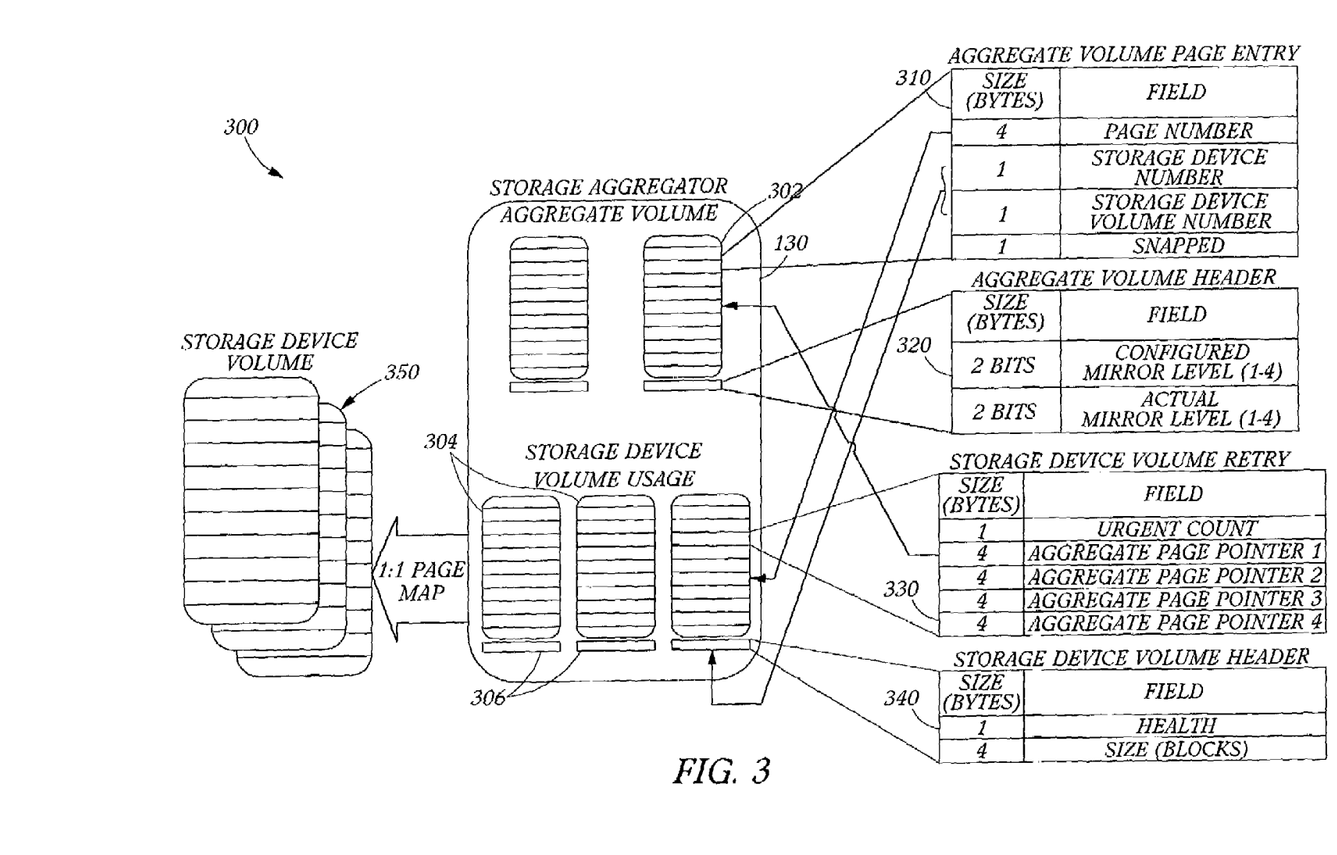
FIG. 3 illustrates a logical view of the storage aggregator of FIG. 1.

FIG. 3 (with reference to FIG. 1) provides a logical view 300 of the storage aggregator 130 and of data flow and storage virtualization within the data storage network 100. As shown, the aggregate volumes 302 within or created by the storage aggregator 130 are the logical LUNs presented to the outside world, i.e., consumers 112 of host server system 110. The storage device volumes (e.g., RAID blade volumes and the like) 350 are real volumes on the storage devices 150. In operation, the storage aggregator 130 divides each storage device volume 350 into pages and the aggregate volumes 302 are each composed of multiple storage device volume pages. If useful for virtualization or other storage operations, each aggregate volume page in the aggregate volumes 302 may be duplicated a number of times (such as up to 4 or more times). The following is a description of a number of the key functions performed by the storage aggregator 130 during operation of the data storage network 100.

The storage aggregator 130 initially and periodically creates the aggregate volumes 302. A storage aggregator 130 advertises all the available free pages of the storage device volumes 350 for purpose of volume 302 creation and in RAID embodiments, includes the capacity at each RAID level (and a creation command will specify the RAID level desired). An aggregate volume 302 may be created of equal or lesser size than the set of free pages of the storage device volumes 350. Additionally, if mirroring is provided, the aggregate volume creation command indicates the mirror level of the aggregate volume 302. The storage aggregator 130 creates an aggregate volume structure when a new volume 302 is created, but the pages of the storage device volumes 350 are not allocated directly to aggregate volume pages. FIG. 3 provides one exemplary arrangement and possible field sizes and contents for the volume pages 310 and volume headers 320. The storage aggregator considers the pool of available pages to be smaller by the number of pages required for the new volume 302. Actual storage device volumes 350 are created by sending a physical volume create command to the storage aggregator 130. The storage aggregator 130 also tracks storage device volume usage as shown at 304, 306 with example storage device volume entries and volume header shown at 330 and 340, respectively.

During I/O operations, writes to an aggregate volume 302 are processed by the storage aggregator 130 such that the writes are duplicated to each page that mirrors data for the volume 302. If pages have not been allocated, the storage aggregator 130 allocates pages in the volume 302 at the time of the writes. Writes to an aggregate page of the volume 302 that is marked as snapped in the aggregate volume page entry 310 cause the storage aggregator 130 to allocate new pages for the aggregate page and for the snapped attribute to be cleared in the aggregate volume page entry 310. Writes to an inaccessible page(s) results in new pages being allocated and previous pages freed. The data storage system 150 performs read operations (such as RDMA read operations) to fetch the data and writes the data to the pages of the storage device volumes 350.

The storage aggregator 130 may act to rebuild volumes. A storage device 150 that becomes inaccessible may cause aggregate volumes 302 to lose data or in the case of a mirrored aggregate volume 302, to have its mirror compromised. The storage aggregator 130 typically will not automatically rebuild to available pages but a configuration command to rebuild the aggregate volume may be issued to the storage aggregator 130. Writes to a compromised aggregate volume page are completed to available page. A storage system 150, such as a RAID blade, that is removed and then reinserted does not require rebuild operations for mirrored aggregate volumes 302. The data written during the period that the storage system 150 was inaccessible is retained in a newly allocated page. Rebuild operations are typically only required when the blade or system 150 is replaced.

To rebuild a volume page, the storage aggregator 130 sends an instruction to an active volume page that dictates the storage system 150 read blocks from the page into remotely accessible memory and then sends a write command to a newly assigned volume page. The data storage system 150 that has the new volume page executes RDMA read operations to the storage system 150 memory that has the active volume page. When the data transfer is done, the data storage system 150 with the new volume page sends a completion command to the storage system 150 with the active volume page and the storage system 150 with the active volume page sends a response to the storage aggregator 130.

In some embodiments, the storage aggregator 130 supports the receipt and execution of a snapshot configuration command. In these embodiments, a configuration command is sent to the storage aggregator 130 to request an aggregate volume 302 be snapshot. A failure response is initiated if there is not enough free pages to duplicate the aggregate volumes 302 in the snapshot request. The storage aggregator 130 checks the snapshot attribute in each aggregate volume page entry 310 in the aggregate volume structure 302. Then, the storage aggregator 130 copies the aggregate volume structure 302 to create the snap. The snapshot of the aggregate volume 302 is itself an aggregate volume 302. Writes to the snap or snapped volume 302 allocate a new page and clear the snapped attribute of the page in the page entry 310.

Figure 4:
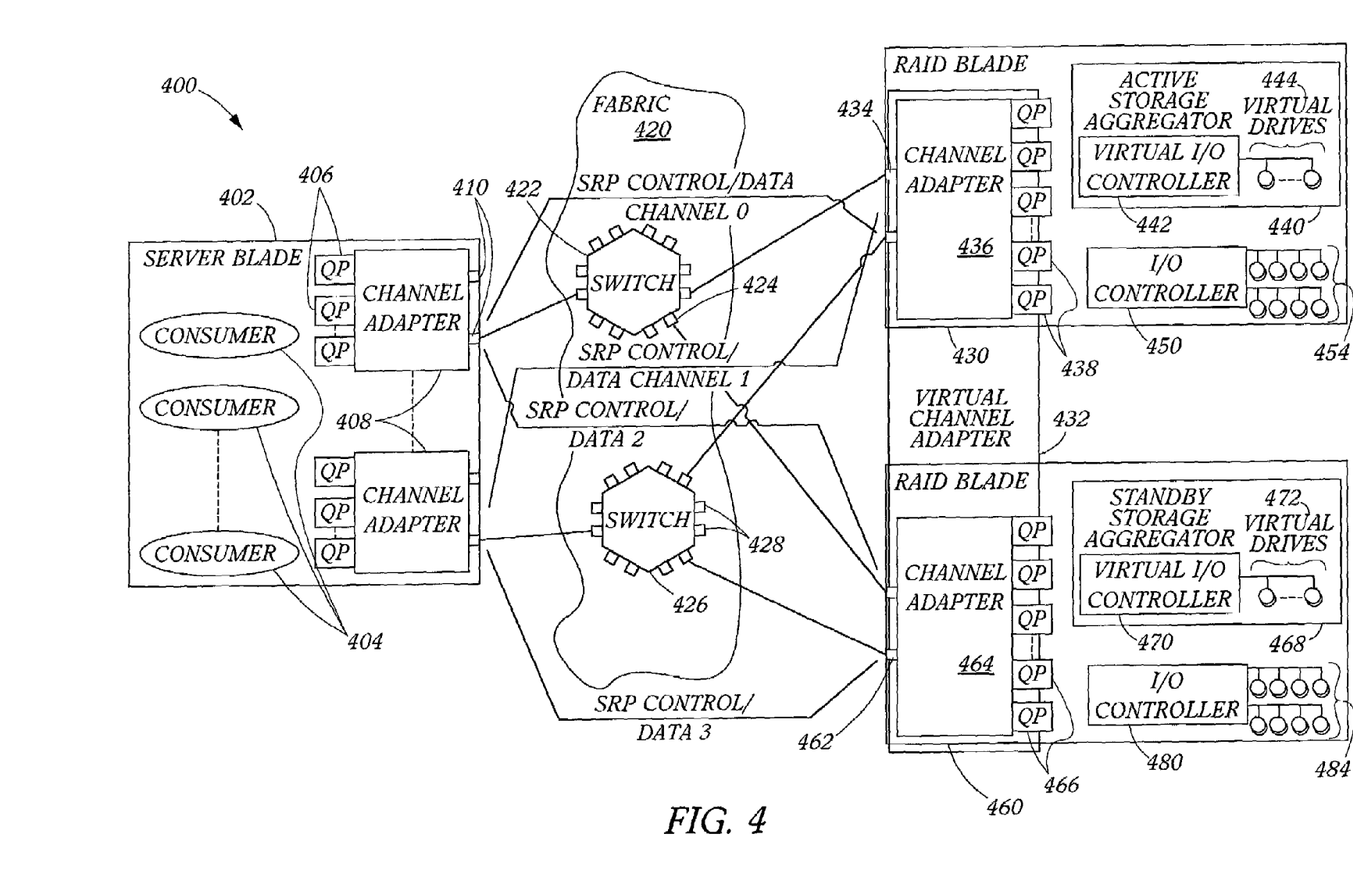
FIG. 4 illustrates an additional data storage network in which storage aggregators are embedded in a RAID blade.

In the case of two storage controllers (such as a redundant controller pair), it may be preferable for financial and technical reasons to not provide a separate device or node that provides the storage aggregation function. FIG. 4 illustrates a data storage network 400 in which storage aggregators are embedded or included within the date storage device or system itself. The example illustrates RAID blades as the storage devices but other redundant controller and storage device configurations may also utilize the storage aggregators within the controller or system.

As illustrated, the data storage network 400 includes a server blade 402 having consumers 404, QPs 406, adapters (such as HCAs) 408 and fabric ports (such as IB ports) 410. The communication fabric 420 is a switched fabric, such as IB fabric, with switches 422, 426 having ports 424, 428 for passing data or messages (such as SRP commands and data) via channels (such as RDMA channels). The network 400 further includes a pair of RAID blades 430, 460. Significantly, each RAID blade 430, 460 has a storage aggregator 440, 468 for providing the aggregation functionality. To provide communications, the RAID blades 430, 460 include ports 434, 462, channel adapters 436, 464, and QPs 438, 466. IO controllers 450, 480 are provided to control input and output access to the drives 454, 484.

One storage aggregator 440, 468 is active and one is standby and each includes a virtual IO controller 442, 470 and virtual drives 444, 472 with functionality similar to that of the components of the storage aggregator 130 of FIGS. 1–3. During operation, the channel adapters 436, 464 are treated as a logical single target channel adapter.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

We claim:

1. A method in a computer system for aggregating storage in a data storage network having a server with one or more consumers, a storage system with available storage, and a communication fabric linking the sewer and the storage system, comprising:
pooling the available storage to create virtual drives;
presenting the virtual drives to the server over the fabric;
in response, receiving a logical command from the server for access to the available storage represented by the virtual drives;
transmitting the logical command to a controller of the available storage identified in the logical command; and,
receiving a snapshot configuration command and copying the virtual drives included in the snapshot configuration command to create snapshot virtual drives.

2. The method of claim 1, further including establishing a direct communication link over the communication fabric between the server and the storage controller to perform actions indicated in the logical command.

3. The method of claim 1, wherein the virtual drives comprise a combination of logical unit numbers (LUNs).

4. The method of claim 3, wherein the pooling includes dividing volumes in the available storage into pages and wherein the combination comprises one or more volumes of LUN pages based on the available storage pages.

5. The method of claim 4, further including determining if the logical command is a write to a pages marked as snapped and based on such determination, allocating a new page for the marked page and clearing the snapped marking.

6. The method of claim 5, wherein the logical command is a small computer system interface (SCSI) read or write.

7. A data storage network with virtualized data storage, comprising:
a communication fabric;
a server system linked to the communication fabric and running applications that transmit data access commands over the communication fabric;
a storage system linked to the communication fabric including data storage devices and a controller for managing access to the data storage devices; and
a storage aggregator linked to the communication fabric having virtual drives comprising a logical representation of the data storage devices, wherein the storage aggregator receives the data access commands pertaining to the virtual drives and forwards the data access commands to the controller of the storage system.

8. The data storage network of claim 7, wherein the storage system responds to the forwarded data access commands by communicating with the server system over the fabric.

9. The data storage network of claim 7, wherein the storage aggregator includes a virtual controller adapted for at least periodically creating the virtual drives based on available volumes in the data storage devices.

10. The data storage network of claim 9, wherein the creating includes dividing the available volumes into pages and wherein the virtual drives include aggregate volumes comprising a plurality of logical unit number (LUN) pages representing pages from the available volumes.

11. The data storage network of claim 7, wherein the data access commands are SCSI commands.

12. The data storage network of claim 7, wherein the data access commands are SCSI RDMA Protocol (SRP) commands.

13. The data storage network of claim 7, wherein the communication fabric is a switched matrix including a switch and the server system, the storage system, and the storage aggregators each include an adapter linked to the switch for transmitting and receiving messages to and from the switch.

14. The data storage network of claim 13, wherein the server system adapter is a host channel adapter and the storage system and storage aggregator adapters are target channel adapters.

15. The data storage network of claim 14, wherein the communication fabric is an InfiniBand Architecture switched communication fabric.

16. A storage aggregation apparatus for virtualizing data access commands, comprising:
an input and output interface linking the storage aggregation apparatus to a digital data communication fabric, wherein the interface receives a data access command from a host server over the fabric;
a command processor configured to parse a data movement portion from the data access command and to transmit the data movement portion to a storage controller; and
a mechanism for receiving a reply signal from the storage controller in response to acting on the received data movement portion directly with the host server and for transmitting a data access response to the host server via the interface and fabric based on the storage controller reply signal.

17. The apparatus of claim 16, wherein the data access command is a SCSI command and the data access response is a SCSI response.

18. The apparatus of claim 16, wherein the apparatus is adapted for controlling access to a pool of storage and further includes a mechanism for creating virtual storage based on the storage pool and for presenting the virtual storage to the host server over the fabric.

19. The apparatus of claim 16, wherein the apparatus is a node on the fabric remote from the storage controller.

20. The apparatus of claim 16, wherein the apparatus is a component of a storage system including the storage controller.

* * * * *

UNITED STATES PATENT AND TRADEMARK OFFICE
CERTIFICATE OF CORRECTION

| | |
|---|---|
| PATENT NO. | : 6,983,303 B2 |
| APPLICATION NO. | : 10/061956 |
| DATED | : January 3, 2006 |
| INVENTOR(S) | : Greg Pellegrino et al. |

It is certified that error appears in the above-identified patent and that said Letters Patent is hereby corrected as shown below:

In column 9, line 43, in Claim 1, delete "sewer" and insert -- server --, therefor.

Signed and Sealed this

Twenty-second Day of December, 2009

David J. Kappos
*Director of the United States Patent and Trademark Office*